July 2, 1968 R. SCHREPFER 3,390,862
VERTICALLY ADJUSTABLE RAISING AND LOWERING MOUNT
Filed Jan. 11, 1967 4 Sheets-Sheet 1

INVENTOR.
RUDOLF SCHREPFER
BY
Russell Chittick & Pfund

July 2, 1968 R. SCHREPFER 3,390,862
VERTICALLY ADJUSTABLE RAISING AND LOWERING MOUNT
Filed Jan. 11, 1967 4 Sheets-Sheet 2
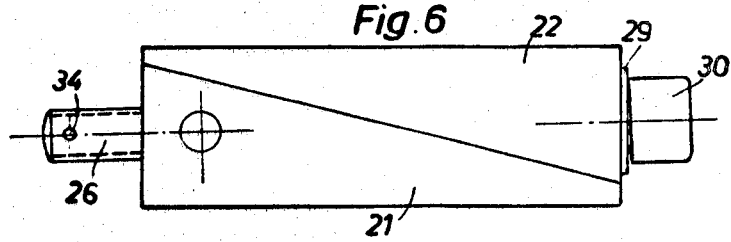
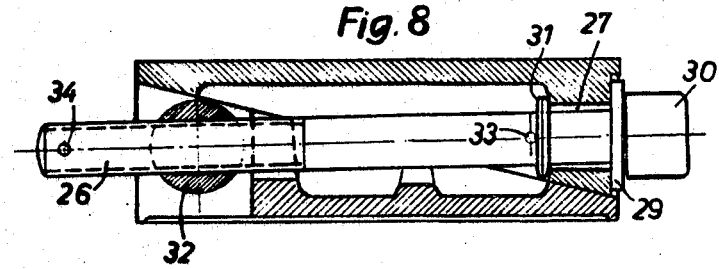
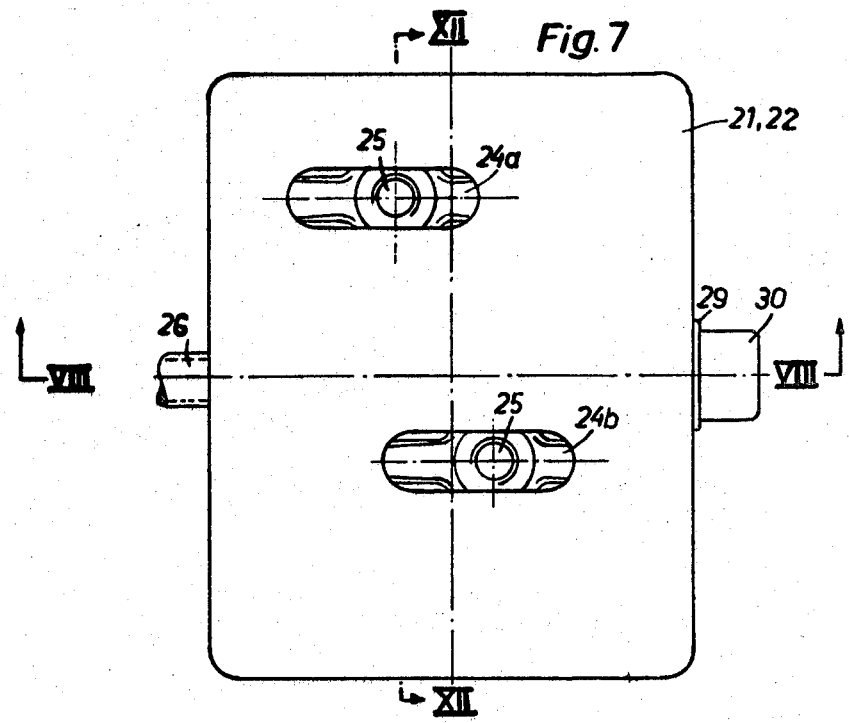
INVENTOR.
RUDOLF SCHREPFER
BY
Russell, Chittick & Pfund July 2, 1968  R. SCHREPFER  3,390,862
VERTICALLY ADJUSTABLE RAISING AND LOWERING MOUNT
Filed Jan. 11, 1967  4 Sheets-Sheet 3
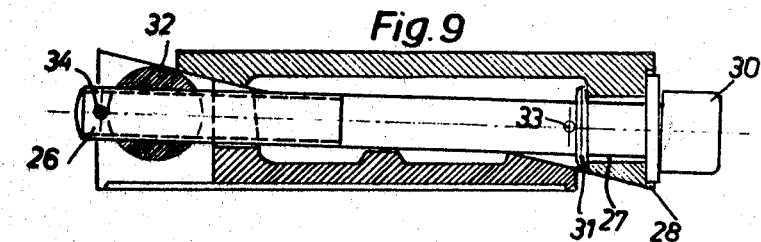
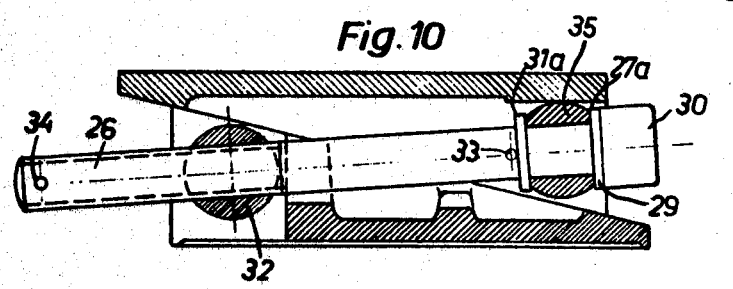
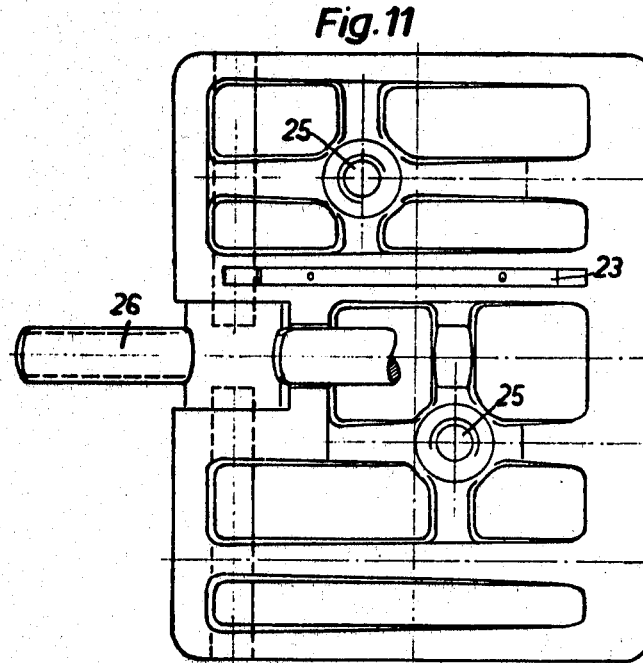
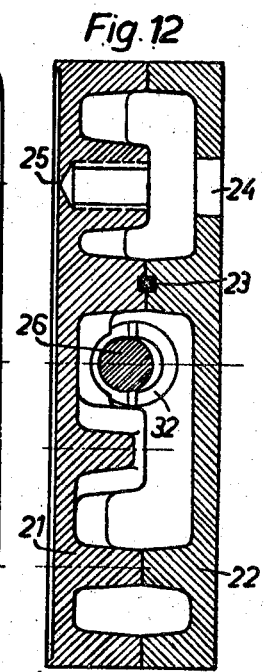
INVENTOR.
RUDOLF SCHREPFER
BY July 2, 1968     R. SCHREPFER     3,390,862
VERTICALLY ADJUSTABLE RAISING AND LOWERING MOUNT
Filed Jan. 11, 1967     4 Sheets-Sheet 4
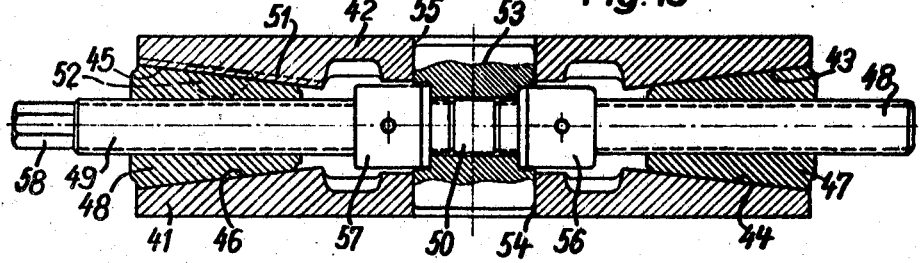
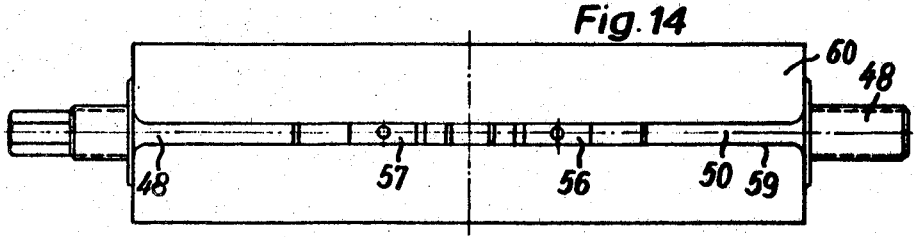
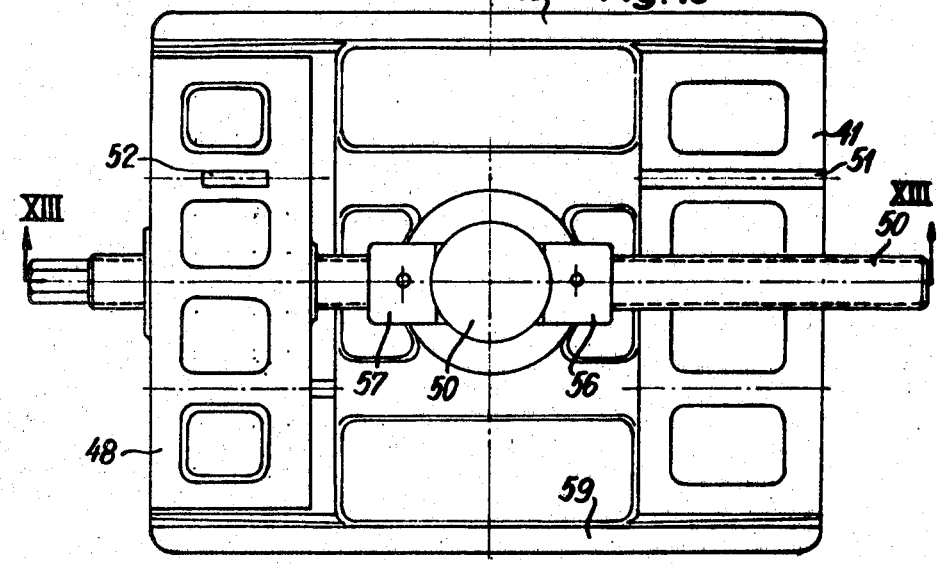
INVENTOR.
RUDOLF SCHREPFER
BY
Russell, Chittick & Pfund United States Patent Office 3,390,862
Patented July 2, 1968

3,390,862
VERTICALLY ADJUSTABLE RAISING AND
LOWERING MOUNT
Rudolph Schrepfer, Eigenheimstr. 22,
Kusnacht, Switzerland
Filed Jan. 11, 1967, Ser. No. 608,599
Claims priority, application Switzerland, Jan. 14, 1966,
478/66; June 1, 1966, 7,984/66
5 Claims. (Cl. 254—104)

ABSTRACT OF THE DISCLOSURE

A pair of plates with parallel exterior surfaces form a mounting foot for machines etc. with interior opposed inclined plane surfaces which slide either relative to each other or to an interposed wedge to increase or decrease the spacing between the parallel exterior surfaces.

Background of the invention

The field of this invention is leveling mounts for supporting machine tools and other devices, usually in conjunction with vibration absorbing pads, to permit the leveling of the machine by individual adjustment of the mounts and to obtain the desired load distribution.

Prior art devices of this type have been limited in the adjusting motions that were possible particularly in being difficult to lower the mount and introducing undesired sliding motion relative to the machine or floor surface that contacts the mount.

Summary of the invention

This invention provides improved mounts which permit a machine to be lowered as well as raised by a screw adjustment on the mount. In two embodiments an intermediate wedge is used to maintain the outer support contacting surfaces laterally aligned irrespective of the adjusted height of the mount. In another embodiment the two opposed plates slide on interior inclined plane surfaces with a bolt running through the two members that is permitted to tilt as the members slide thus permitting a wide range of adjustment. In each embodiment adjustments under load can be made in either the expanding or contracting direction to raise or lower the machine.

Brief description of the drawings

FIGURE 6 is a side elevation of a second form of the invention;
FIGURE 7 is a top view of the device shown in FIGURE 2;
FIGURE 8 is a view in cross section taken along line VIII—VIII of FIGURE 7;
FIGURE 9 is a view in cross section similar to FIGURE 8 of the foot lowered;
FIGURE 10 is a cross section similar to FIGURE 8 showing a variation of the embodiment shown in FIGS. 6–9, with the foot raised;
FIGURE 11 is a top view of the embodiment shown in FIGURE 10;
FIGURE 12 is a sectional view taken of the embodiment of FIGS. 10 and 11 corresponding to the view along line XII—XII of FIGURE 7;
FIGURE 13 is a sectional view of a third embodiment taken along line XIII—XIII of FIGURE 15;
FIGURE 14 is a side elevation view of FIG. 13;
and
FIGURE 15 is a top view of FIG. 13, partly broken away.

Description of the preferred embodiments

Referring to the embodiment of FIGURES 1–5, the leveling foot has a lower supporting member 1, which rests on the floor, and an upper supporting member 2 upon which the machine or its feet rest. Each member has an inclined surface 3, 4, respectively, which surfaces converge. These surfaces bear upon a wedge 5 located between them.

Figure 1:
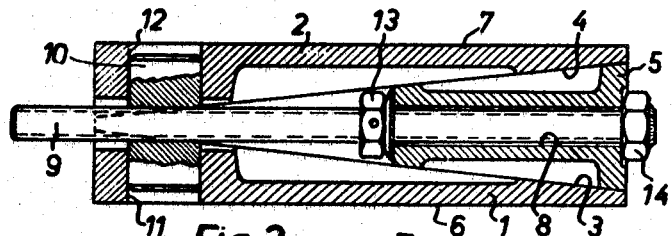
FIGURE 1 is a cross sectional view taken along line I—I of FIGURE 2, of one form of the invention.
Figure 2:
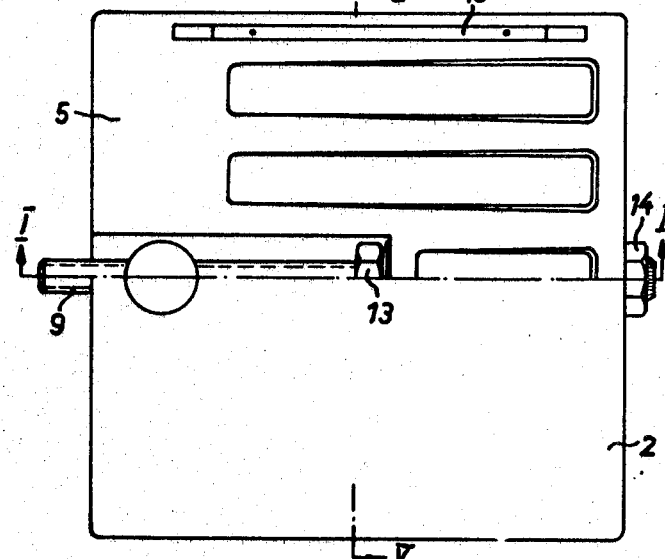
FIGURE 2 is a top view of FIG. 1, partly broken away.

When put together, FIGURE 1, the members 1, 2, 5 define, in cross section, a rectangle having upper and lower surfaces 7, 6 in contact with the machine and the floor, respectively. As shown at FIGURE 2, the wedge 5 has approximately the form of a U. A threaded bolt 9 is located in a bore 8 located in the middle of the wedge and extending in the direction of its convergent surfaces. The bolt extends through the entire assembly of members 1, 2, 5 and projects beyond the members 1, 2 in the initial adjustment of the leveling foot, FIGURE 1.

One end of the bolt 9 is threaded through the threaded hole in a pin 10 of which the axis is perpendicular to that of the bolt and of which the two ends are located in respective bores 11, 12 in the members 1, 2. The pin 10 is vertically relatively movable with respect to the members 1, 2 and serves as a horizontally fixed nut for the bolt 9 and also to hold parts 1, 2, 5 together in the horizontal direction.

The wedge 5 is prevented from moving along the bolt axis by a nut 13, 14 at each end of the bore 8, but the bolt 9 remains free to turn. The nuts 13, 14 are respectively secured to the bolt by a pin and by welding.

Figure 5:
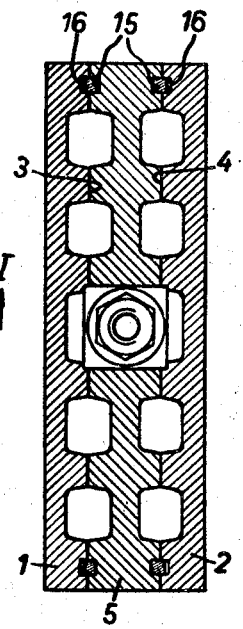
FIGURE 5 is a sectional view along line V—V of FIGURE 2.

Both of the inclined surfaces of the wedge have grooves, FIGURE 5, in which a rail member 15 is secured and which slides in mating grooves 16 in the member 1 or 2.

As shown at FIGURES 2, 5, the surfaces 3, 4 of members 1, 2 and the cooperating surfaces of the wedge have recesses.

Figure 3:
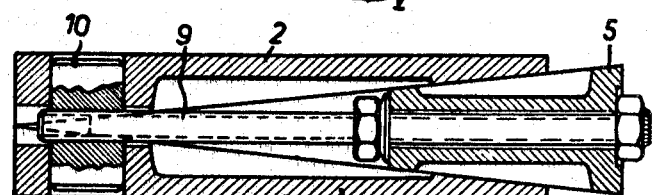
FIGURES 3 and 4 are sectional views similar to FIGURE 1 showing the embodiment in two different adjustments.
Figure 4:
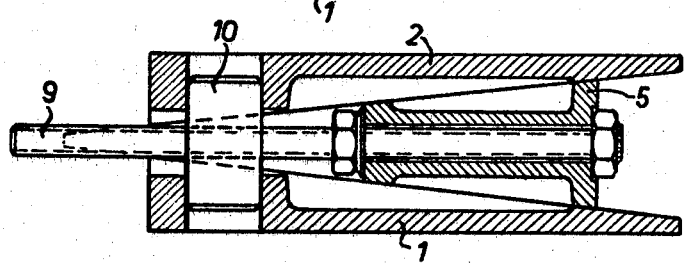

Use of the leveling foot is very simple. Its relatively short height simplifies insertion of a foot under the machine. Before insertion the foot should be adjusted as shown at FIGURE 1. When the foot is in position under the machine the nut 14 is gripped by a box spanner and the bolt turned. If turned clockwise, the bolt is threaded through the pin 10, moving the wedge leftwards, FIGURE 1, and raising the member 2. By suitably adjusting the other leveling feet under the machine, the latter is quickly and easily leveled. FIGURES 3, 4 show the extreme positions of the wedge and the foot correspondingly lowered or raised.

As a particular virtue of this construction, during adjustment of the foot the member 1 never moves, member 2 moves only vertically, and the wedge 5 moves substantially horizontally. Thus, when leveling, there being no friction between the machine and the foot to overcome, it is only necessary, when raising the foot's height, to overcome the portion of the machine's weight borne by the foot.

Advantageously, the surfaces 6, 7 can be provided with a vibration damping layer which, because neither member 1 or 2 moves laterally, will not be destroyed by lateral loading. The invention in combination with such damping can be used for machines of which the installation requires vibration damping measures.

Referring to the form of FIGURES 6–9, 11, 12, the leveling foot has a lower inclined plane 21 resting on the floor and an upper inclined plane 22, resting on the lower, and supporting the machine. The inclined plane 21, of which the lower surface can be provided with a vibration and sound damping layer, incorporates recesses on its upper surface that extend preferably in the direction of inclination of the plane. The lower surface of inclined plane 22 has recesses aligned with those of the other inclined plane, whereby the opposed surfaces of the two inclined planes are in contact and the upper surface slides over the lower during adjustment of the foot. To assure parallel movement of inclined plane 22 on inclined plane 21, at least one pair of aligned grooves is provided in the opposed surfaces and a rail member 23 fixed in one groove of a pair.

Since the inclined plane 22 is moved with respect to the machine over 21 during adjustment of the foot, it is necessary to secure the relative positions of the machine and the lower inclined plane. To this end the upper inclined plane is provided with one or more slots (here two) 24a, b having a length accommodating that of the movement of 22 on 21. Below each slot is located a groove or a recess 25, which later, as shown, can be threaded. The machine can be fixed in these recesses 25, without hindering the movement of inclined plane 22. The recesses can extend all the way through the lower inclined plane.

Movement of the upper inclined plane over the lower is effected by a threaded bolt 26 located in two aligned recesses parallel to the rail 23 and provided in respective ones of the inclined planes. The inclined plane 22 has an opening 27 sufficiently large to receive the bolt 26. The outer end of the opening terminates in a round recess 28 that receives a washer 29 having an outer diameter somewhat smaller than that of the recess and an inner diameter only slightly greater than the diameter of the bolt 26. The head 30 of the bolt comes to bear on the washer 29 as soon as the bolt is turned to raise the upper inclined plane. A washer 31, tapered along the outer edge on both faces, and having an outer diameter exceeding that of the opening 27 by a certain amount and an inner diameter just sufficient to accept the bolt, is located on the inner side of the opening. The washer can be composed of two halves side by side. The function of the washer 31 is to support the bolt when the inclined plane 22 is in its lower position. A small bore, located immediately behind the washer 31, extends through the bolt and receives a pin 33.

Located opposite the opening 27 is a recess in the other end of inclined plane 21 for receiving and holding a cylindrical nut 32. The bolt is screwed through the nut until the upper inclined plane has reached the desired height. In order to permit axial alignment of the nut 32 and bolt 26 for all possible positions of the upper inclined plane, it is essential that the bolt be free to incline. As illustrated at FIGURES 8–10, the nut pivots and the bolt is free to move up and down in the recess. FIGURES 6–8 illustrate the two inclined planes in vertical alignment; and it is to be understood that even here the bolt and nut axes are not parallel to the upper and lower horizontal edges of the foot. In the highest position (FIGURE 10) of the inclined plane 22, which is determined by the end of the thread on the bolt, the inclination of the bolt with reference to the horizontal surface of the foot is at its greatest. FIGURE 9 shows the upper inclined plane in its lowest position, the bolt being upwardly inclined with respect to the foot's horizontal surfaces. This lowest position is determined by a pin 34 abutting against the nut 32.

To raise the upper inclined plane, the bolt is turned clockwise (assuming a right-hand thread) in the nut 32, the head 30 of the bolt bearing on the washer 31 and forcing the inclined plane to raise up the ramp.

The upper inclined plane is lowered by turning the bolt in the opposite direction, causing the washer 31 to bear on the inclined plane.

The slope of the inclined plane and the range of sliding adjustment can be varied to meet a wide variety of demands.

FIGURE 10 illustrates a variation of the previous embodiment. In cross section the opening 27a in the upper inclined plane is an inverted U. The recess 28 and washer 29 are eliminated. To permit the bolt to incline for all possible relative positions between the two inclined planes, and alignment of the axes of the bolt and cylindrical nut 32, a cylindrical nut 35, generally similar to 32, is provided. The nut is secured to the bolt by a circular spring 31a held by a pin 33. This variation is simpler in construction than the previous form, yet permits the necessary inclination of the bolt.

The further embodiment shown at FIGURES 13–15 is symmetrical in the plane of FIGURE 13, and includes a lower member 41 resting on the floor and an upper member 42 supporting the machine. Between each pair of inclined surfaces 43, 44 or 46, 51 is located a wedge 47 or 48. The wedges are formed as threaded nuts screwed onto respective threaded portions 48, 49 of a bolt 50. The inclined surfaces of members 41, 42 have grooves 51 in the direction of the bolt 50. Elements 52 (only one shown) fixed in the wedges engage these grooves and thereby guide the movement of the wedges. The bolt 50 is mounted for turning in a cylindrical centering bolt 53 located in respective bores 54, 55 of the members 41, 42 and the axis of which is perpendicular to that of bolt 50. The bolt 53 is movable vertically relative to the members. A nut 56, 57, screwed onto the threaded portion 48, 49, is located on each side of the bolt 53 and fixed to the bolt 50 by a pin. These nuts act as stop to prevent horizontal movement of the bolt 50. The nuts 56, 57 extend into recesses in the bolt 53. The two ends of the bolt 50 project beyond the members 41, 42 and one end of the bolt is formed as a hexagon to engage a box spanner.

The members 41, 42 (FIGURES 14, 15) are provided with opposed flanges 59, 60. In FIGURE 15 the upper inclined plane and the right hand wedge have been removed to show the inclined surface 44 with its recesses.

The leveling foot is employed as follows. The foot is initially set, for example, at its middle adjustment, FIGURE 13. The foot is placed under the machine, and with a spanner engaging the end 58, the bolt 50 is turned in the one or other direction to raise or lower the upper inclined plane. Clockwise rotation draws the wedges 47, 48 together, raising the inclined plane 42 and also of course the bolts 50, 53. In the uppermost position of 42 the wedges abut the nuts 56, 57; and in the lowermost position the upper skirt-like flange 60 comes to rest on the lower 59.

The centering bolt 53, which remains in both bores 54, 55 for all positions of the wedges, moves vertically relative to the members 41, 42 and serves to guide the latter in the vertical direction.

Advantageously, the foot's upper and lower horizontal surfaces can be provided with a vibration damping layer which, because neither member 41, 42 moves laterally, will not be destroyed by lateral loading. With the embodiment these surfaces can also be very large for a foot relatively short in height. Moreover, since the forces on the mounting for bolt 50 act from opposite sides, the mounting is loaded relatively little and does not require a particularly strong construction.

All forms of the invention possess the common advantage that the height of a foot can be reduced while the foot is in use. This is particularly useful when, during leveling of a machine, one or more of the feet employed must be lowered.

What I claim is:

1. A leveling foot, including: an upper member for supporting the object to be leveled; a lower member spaced from the upper member for resting on the floor, said upper and lower members having aligned transverse apertures therein; at least one pair of opposed convergent surfaces formed by a horizontally inclined surface on each said member; a wedge located between said pair of surfaces and in contact therewith; a bore in said wedge extending in the direction of convergence of said surface pair; a threaded bolt located between said pair of surfaces, said bolt extending through said bore and secured to said wedge for moving the latter horizontally in either direction with respect to said surface pair when turned, a pin having a threaded hole therein and slidably fitted in said apertures for maintaining said upper and lower members in alignment as the separation therebetween changes due to the position of said wedge, said pin and apertures being located to receive said bolt in threaded engagement with said hole in said pin whereby rotation of said bolt moves said wedge in either horizontal direction to raise or lower said upper member.

2. The leveling foot according to claim 1, wherein said pin is a cylinder the axis of which is perpendicular to that of said bolt.

3. A leveling foot including:
an upper member for supporting the object to be leveled;
a lower member spaced from the upper member for resting on the floor, said upper and lower members having two laterally spaced opposed convergent surface pairs formed by horizontally inclined surfaces on each said member and said members having aligned transverse apertures therein;
a pair of wedges one located between each convergent surface pair and each wedge having a threaded axial bore aligned with the bore of the other wedge;
a pin having a hole therein and slidably fitted in said apertures for maintaining said upper and lower members in alignment as the separation therebetween changes due to the position of said wedges;
a threaded bolt extending in threaded engagement through both of said wedges and through said hole in said pin; and
means for preventing axial movement of said bolt through said pin as said bolt is rotated to move said wedges.

4. The leveling foot according to claim 3, in which said pin is a cylinder and including two spaced stop members fixed on said bolt, located on either side of said cylinder.

5. A leveling foot comprising:
an upper member adapted for supporting the object to be leveled;
a lower member generally congruent with said upper member and adapted to rest on the floor; said upper and lower members having aligned transverse apertures therein;
inclined plane surface means in sliding contact between said upper and lower members for changing the distance separating the opposite exterior surfaces of said members;
screw means disposed approximately horizontally between said members and operable to produce relative sliding motion between said inclined plane surface means, said screw means operable in both directions to either raise or lower the object supported on said foot, and a pin slidably fitted in said apertures for transversely stabilizing said upper and lower members for any adjusted position of separation therebetween, said screw means defining means mounted to pass rotatably through said pin.

References Cited

UNITED STATES PATENTS

| | | | |
|---|---|---|---|
| 139,351 | 5/1873 | Ames | 254—42 |
| 530,124 | 12/1894 | Perry | 254—42 |
| 1,073,838 | 9/1913 | Barton | 254—42 |
| 2,034,076 | 3/1936 | Zahner | 254—104 X |
| 2,170,690 | 8/1939 | Mafera | 254—104 |
| 2,524,961 | 10/1950 | Cramer | 254—104 |
| 2,583,880 | 1/1952 | Premo | 254—104 X |
| 3,251,310 | 5/1966 | Wittwer et al. | 254—104 X |

OTHELL M. SIMPSON, *Primary Examiner.*